(12) United States Patent
Ohizumi

(10) Patent No.: US 10,339,396 B2
(45) Date of Patent: Jul. 2, 2019

(54) VEHICLE ACCESSIBILITY DETERMINATION DEVICE

(71) Applicant: CLARION CO., LTD., Saitama (JP)

(72) Inventor: Yuta Ohizumi, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 15/548,930

(22) PCT Filed: Jan. 6, 2016

(86) PCT No.: PCT/JP2016/050236
§ 371 (c)(1),
(2) Date: Aug. 4, 2017

(87) PCT Pub. No.: WO2016/129301
PCT Pub. Date: Aug. 18, 2016

(65) Prior Publication Data
US 2018/0032823 A1  Feb. 1, 2018

(30) Foreign Application Priority Data

Feb. 10, 2015  (JP) .................................. 2015-024261

(51) Int. Cl.
*G06K 9/00* (2006.01)
*G06T 7/13* (2017.01)
(Continued)

(52) U.S. Cl.
CPC ............ *G06K 9/00805* (2013.01); *B60R 1/00* (2013.01); *B60R 21/00* (2013.01); *G06K 9/00812* (2013.01); *G06T 1/00* (2013.01); *G06T 7/13* (2017.01); *G06T 7/174* (2017.01); *G06T 7/60* (2013.01); *G08G 1/16* (2013.01); *H04N 7/18* (2013.01); *B60R 2300/304* (2013.01);
(Continued)

(58) Field of Classification Search
None
See application file for complete search history.

(56) References Cited

U.S. PATENT DOCUMENTS

2008/0205706 A1* 8/2008 Hongo ..................... B60R 1/00
382/104
2012/0219183 A1* 8/2012 Mori ........................ G06T 7/20
382/103
2014/0218481 A1 8/2014 Hegemann et al.

FOREIGN PATENT DOCUMENTS

JP          10-062162         3/1998
JP          11-16097          1/1999
(Continued)

OTHER PUBLICATIONS

International Search Report dated Mar. 29, 2016 in International (PCT) Application No. PCT/JP2016/050236.
(Continued)

*Primary Examiner* — Christopher Braniff
(74) *Attorney, Agent, or Firm* — Wenderoth, Lind & Ponack, L.L.P.

(57) ABSTRACT

An image convertor converts an original image captured by a front camera. The original image includes a road surface around a vehicle. A three-dimensional object detector detects from a virtual image a three-dimensional object having a height from the road surface. A vehicle accessibility determiner determines whether the vehicle can access to the inside of the detected three-dimensional object or to a clearance among other three-dimensional objects.

5 Claims, 15 Drawing Sheets

(51) Int. Cl.
  G06T 7/174    (2017.01)
  G06T 7/60     (2017.01)
  B60R 1/00     (2006.01)
  H04N 7/18     (2006.01)
  G08G 1/16     (2006.01)
  G06T 1/00     (2006.01)
  B60R 21/00    (2006.01)

(52) U.S. Cl.
  CPC ...... *B60R 2300/80* (2013.01); *G06K 2209/40* (2013.01); *G06T 2207/20224* (2013.01); *G06T 2207/30252* (2013.01)

(56) References Cited

FOREIGN PATENT DOCUMENTS

| | | |
|---|---|---|
| JP | 2009-093332 | 4/2009 |
| JP | 2009-188635 | 8/2009 |
| JP | 2011-57101  | 3/2011 |
| JP | 2012-147149 | 8/2012 |
| JP | 2012-175314 | 9/2012 |
| WO | 2012/039004 | 3/2012 |

OTHER PUBLICATIONS

Extended European Search Report dated Sep. 7, 2018 in European Application No. 16748946.7.

\* cited by examiner

OVERHEAD IMAGE 72(t−Δt) AT TIME t−Δt

OVERHEAD IMAGE 72(t) AT TIME t

RESULT OF FRAME DIFFERENCE 72(t)−72(t−Δt)

RESULT OF FRAME DIFFERENCE 72(t)−72'(t)

VEHICLE ACCESSIBILITY DETERMINATION DEVICE

CROSS-REFERENCE TO RELATED APPLICATION

The present application is based on and claims priority from Japanese Patent Application No. 2015-024261, filed on Feb. 10, 2015, the disclosure of which is hereby incorporated by reference in its entirety.

TECHNICAL FIELD

This invention relates to a device for processing images around a vehicle that are captured by a camera attached to the vehicle, and particularly to processing by converting the images around the vehicle into an overhead image.

BACKGROUND ART

When coordinate conversion is performed on images around a vehicle into overhead images or bird's-eye view images to display the converted images, three-dimensional objects are displayed with distortion. Therefore, it is difficult to determine how close the vehicle can access to the three-dimensional objects by seeing the overhead images. Accordingly, a device that corrects the distortion of three-dimensional objects generated by image conversion into overhead images, and displays corrected images has been proposed, for example (Patent Literature 1: JP 2012-147149 A, for example).

SUMMARY

Technical Problem

A vehicle periphery image display device disclosed in Patent Literature 1 can correct the distortion of the three-dimensional objects which are placed on a road surface. However, in a case where a portion of the three-dimensional objects is not placed on the road surface but floating in the air, when the floating portion is converted into overhead images, the portion is projected to be deformed and inclined toward the road surface in a direction away from the vehicle. Therefore, relying on the overhead images, the vehicle may hit the three-dimensional objects when the vehicle is moved close to the three-dimensional objects. In addition, when the three-dimensional object is an object such as a garage the vehicle enters, it cannot be determined whether the vehicle can enter the garage or not only by seeing the overhead images.

The present invention is made in view of above problems. The present invention determines whether there is a space to which a vehicle can access in a three-dimensional object detected on a road surface around the vehicle, and determines whether the vehicle can access to the space or not.

Solution to Problem

To solve the above problems, a vehicle accessibility determination device of the present invention includes an imager that is attached to a vehicle and captures a range including a road surface around the vehicle; an image convertor that converts an original image captured by the imager into a virtual image viewed from a predetermined viewpoint; a three-dimensional object detector that detects from the virtual image a three-dimensional object having a height from the road surface; and a vehicle accessibility determiner that determines whether the vehicle is capable of accessing to an inside of the three-dimensional object or to a clearance of other three-dimensional objects.

DESCRIPTION OF EMBODIMENTS

Embodiments of a vehicle accessibility determination device of the present invention are described with reference to the drawings.

First Embodiment

In this embodiment, the present invention is adopted to a vehicle accessibility determination device that detects a three-dimensional object around a vehicle, determines whether the vehicle can access to the detected three-dimensional object, and then informs a driver of a result.

(Description of Overall Configuration)

First, the functional configuration of this embodiment is described with reference to FIGS. 1-3.

Figure 1:
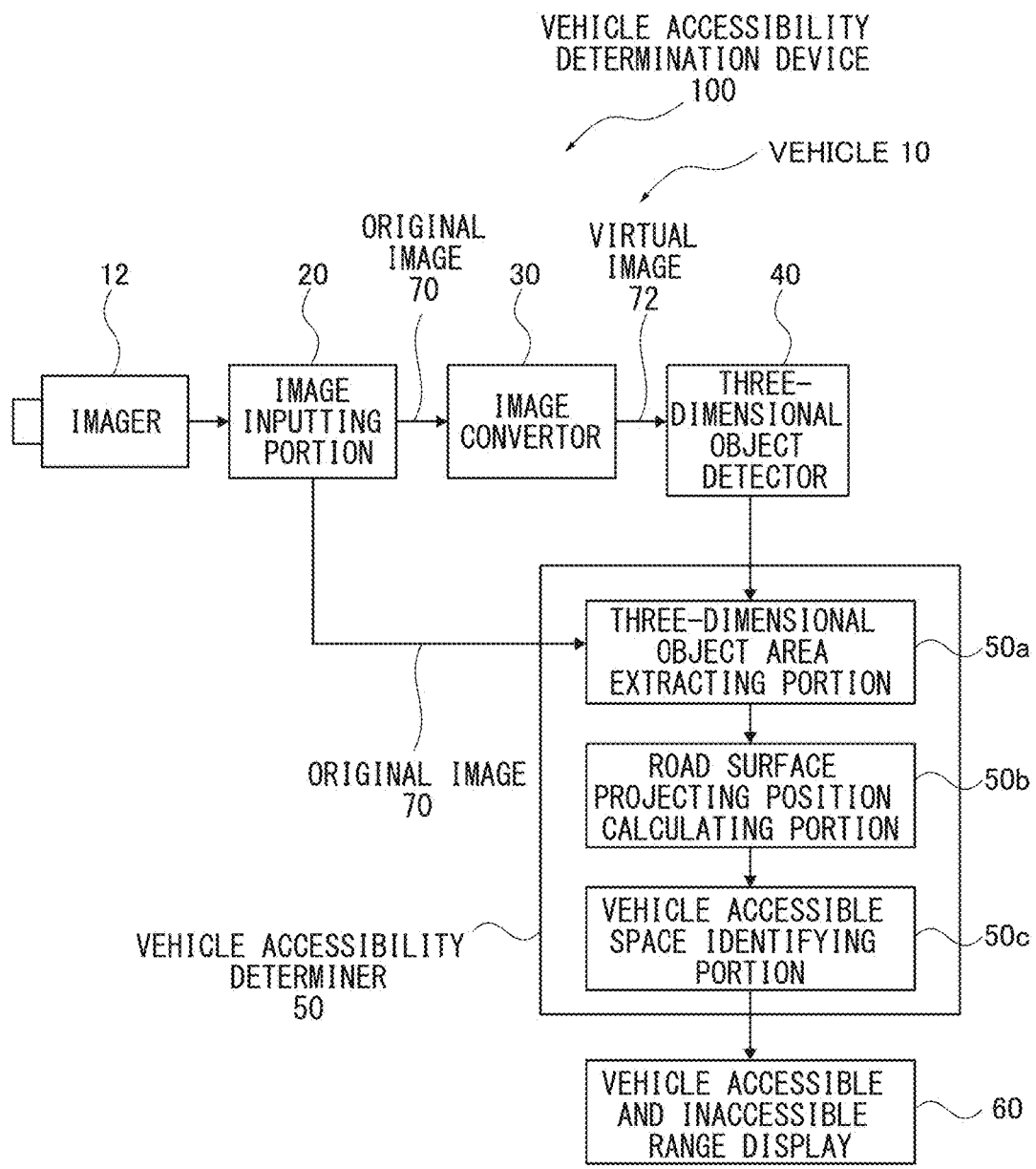
FIG. 1 is a functional block diagram illustrating a functional configuration of a vehicle accessibility determination device according to a first embodiment of the present invention.

As shown in FIG. 1, a vehicle accessibility determination device 100 of the present invention includes an imager 12, an image inputting portion 20, an image convertor 30, a three-dimensional object detector 40, a vehicle accessibility determiner 50, and a vehicle accessible and inaccessible range display 60. The imager 12 is mounted to a vehicle 10 to capture images including a road surface in front of the vehicle 10. The image inputting portion 20 converts an image signal output from the imager 12 into an original image 70 which is in a digital image format capable of being processed by a computer. The image convertor 30 converts the original image 70 into a virtual image 72 viewed from a predetermined viewpoint. The three-dimensional object detector 40 detects from the virtual image 72 a three-dimensional object having a height from the road surface. The vehicle accessibility determiner 50 determines whether the vehicle 10 can access to the inside of the detected three-dimensional object or to a space defined between the detected three-dimensional objects. The vehicle accessible and inaccessible range display 60 displays a range to which the vehicle can access or a range to which the vehicle cannot access as a result of the vehicle accessibility determination by the vehicle accessibility determiner 50.

Figure 2:
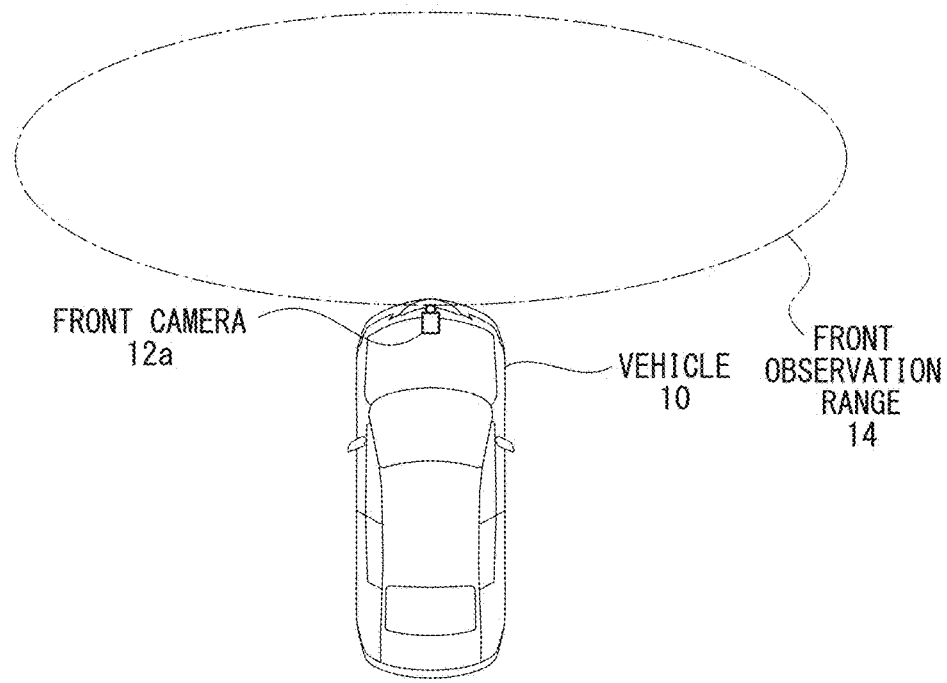
FIG. 2 shows a mounting condition of an imager to a vehicle in the vehicle accessibility determination device according to the first embodiment.

As shown in FIG. 2, the imager 12 is attached to the front portion of the vehicle 10 and captures the inside of a front observation range 14 in the visual field range of 180 degrees. The front observation range 14 includes a road surface right before the vehicle 10.

Figure 3:
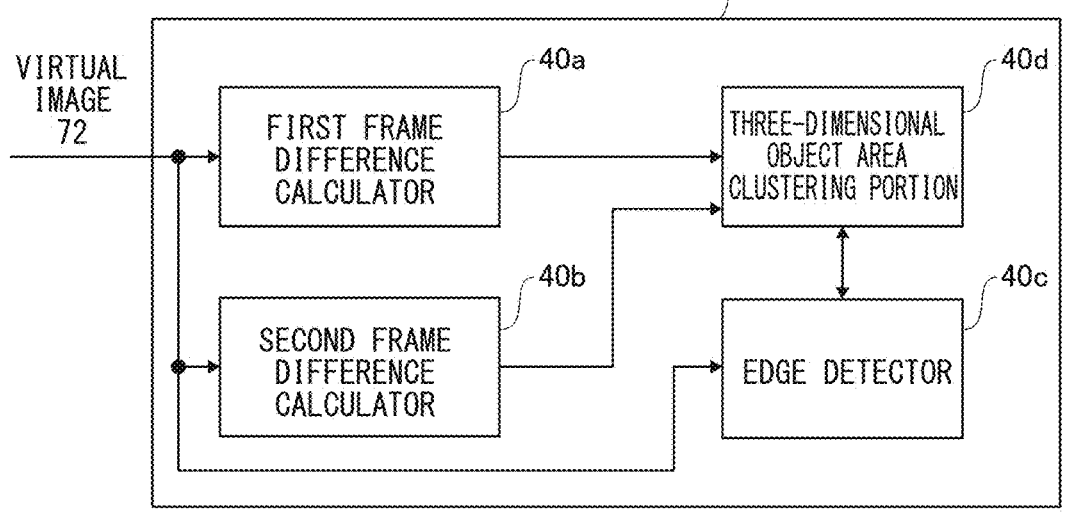
FIG. 3 is a functional block diagram illustrating a detailed functional configuration of a three-dimensional object detector in the vehicle accessibility determination device according to the first embodiment.

As shown in FIG. 3, the three-dimensional object detector 40 specifically includes a first frame difference calculator 40a, a second frame difference calculator 40b, an edge detector 40c, and a three-dimensional object area clustering portion 40d. The first frame difference calculator 40a performs a frame difference between two virtual images $72(t)$, $72(t-\Delta t)$ that are generated from two original images $70(t)$, $70(t-\Delta t)$, respectively. The two original images $70(t)$, $70(t-\Delta t)$ are captured by the imager 12 (FIG. 1) at a predetermined time interval, converted by the image convertor 30 (FIG. 1), and obtained at different times. The second frame difference calculator 40b generates an expected virtual image $72'(t)$ at time t from the virtual image $72(t-\Delta t)$ generated from the original image $70(t-\Delta t)$ obtained at time $(t-\Delta t)$. The second frame difference calculator 40b then performs a frame difference for subtracting the expected virtual image $72'(t)$ from the virtual image $72(t)$ actually obtained at time t. The edge detector 40c detects from the virtual image $72(t)$ pixels which change in brightness more than adjacent pixels. In other words, the edge detector 40c detects pixels constituting an edge. The three-dimensional object area clustering portion 40d detects an area which is considered constituting a three-dimensional object based on the calculated result of the first frame difference calculator 40a and the calculated result of the second frame difference calculator 40b, and the detected result of the edge detector 40c.

As shown in FIG. 1, the vehicle accessibility determiner 50 specifically includes a three-dimensional object area extracting portion 50a, a road surface projecting position calculating portion 50b, and a vehicle accessible space identifying portion 50c. The three-dimensional object area extracting portion 50a extracts an area corresponding to the three-dimensional object detected by the three-dimensional object detector 40 from the original image 70. The road surface projecting position calculating portion 50b calculates a road surface projection position. The road surface projection position indicates a limit position in which the vehicle can access to the three-dimensional object relative to the three-dimensional object area extracted by the three-dimensional object area extracting portion 50a. The vehicle accessible space identifying portion 50c identifies whether there is a space inside the three-dimensional object or in a clearance among other three-dimensional objects to which the vehicle 10 can access.

Now, the configuration of hardware is described with reference to FIG. 4. The vehicle accessibility determination device 100 according to this embodiment includes ECU (electronic control unit) 110, a front camera 12a, a vehicle condition sensor 140, and a monitor 150. ECU 110 is mounted to the vehicle 10 and performs required image processing and/or arithmetic processing. The front camera 12a is connected to ECU 110 and constitutes the imager 12 (FIG. 1). The vehicle condition sensor 140 calculates a moving direction and a moving amount of the vehicle 10 by sensing the behavior of the vehicle 10. The vehicle condition sensor 140 consists of a steering angle sensor and/or a distance sensor. The monitor 150 displays a processed result of the vehicle accessible and inaccessible range display 60 (FIG. 1).

ECU 110 includes CPU 112, a camera interface 114, a sensor interface 116, an image processing module 118, a memory 120, and a display controller 122. CPU 112 receives and transmits required data, and executes programs. The camera interface 114 is connected to CPU 112 and controls the front camera 12a. The sensor interface 116 obtains measured results of the vehicle condition sensor 140. The image processing module 118 performs image processing with predetermined programs stored in the module 118. The memory 120 stores intermediate results of the image processing, required constants, programs, or the like. The display controller 122 controls the monitor 150.

The image inputting portion 20, the image convertor 30, the three-dimensional object detector 40, the vehicle accessibility determiner 50, and the vehicle accessible and inaccessible range display 60 described in FIG. 1 are respectively controlled with pieces of software, each of which achieves an operation described below. The pieces of software are stored in the memory 120 and executed when needed. Note that the pieces of software may be stored in CPU 112 and/or the image processing module 118 if required.

(Description of a Flow of Processes Performed in the Vehicle Accessibility Determination Device)

Figure 5:
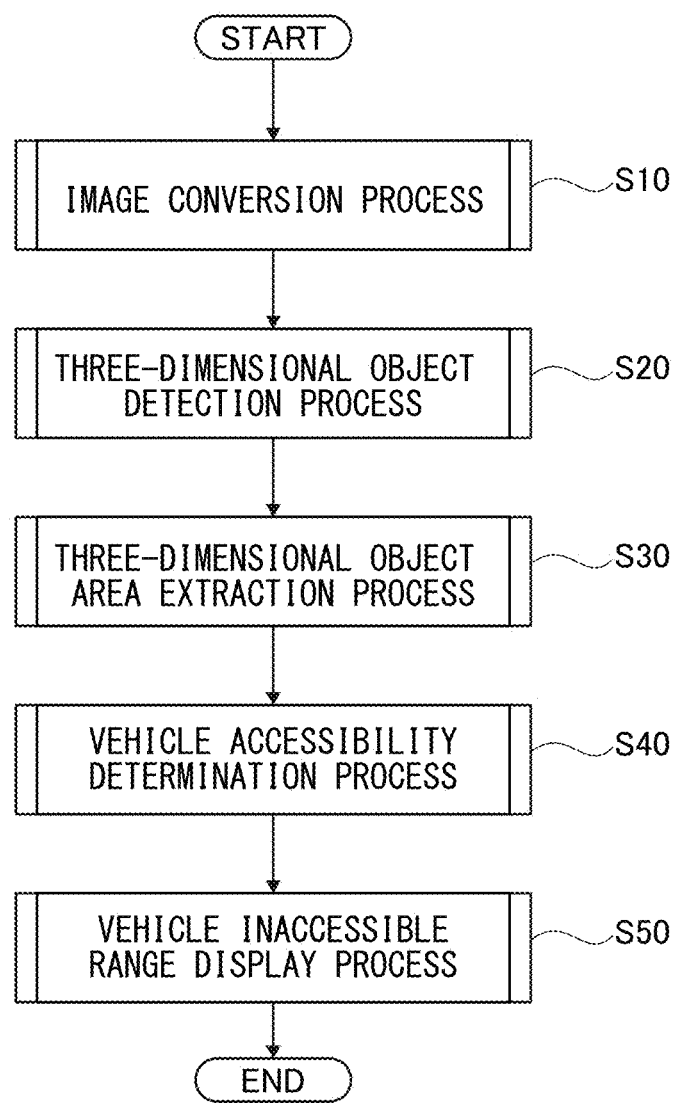
FIG. 5 is a flowchart illustrating a flow of a series of processes performed in the first embodiment.

Now, a series of the processes in the vehicle accessibility determination device 100 is described with reference to a flowchart shown in FIG. 5. Note that each of the processes is now described briefly but will be described in detail later.

(Step S10)

An image conversion process is performed. Specifically, the captured original image is converted into the virtual image.

(Step S20)

A three-dimensional object detection process is performed. The detailed process will be described later.

(Step S30)

A three-dimensional object area extraction process is performed. The detailed process will be described later.

(Step S40)

A vehicle accessibility determination process is performed. The detailed process will be described later.

(Step S50)

A vehicle inaccessible range display process is performed. The detailed process will be described later.

Hereinafter, each of the processes performed in the vehicle accessibility determination device 100 is described in order.

(Description of Image Conversion Process)

First, the operation of the image conversion process is described with reference to FIG. 1 and FIGS. 6A, 6B. The image conversion process is performed in the imager 12, the image inputting portion 20, and the image convertor 30 shown in FIG. 1.

Specifically, the image inputting portion 20 converts an output from the front camera 12a (FIG. 4), which constitutes the imager 12, into a digital image. The converted digital image is input to the image convertor 30 as the original image 70 shown in FIG. 6A. Note that the original image captured at time t is indicated with 70(t).

Figure 6A:
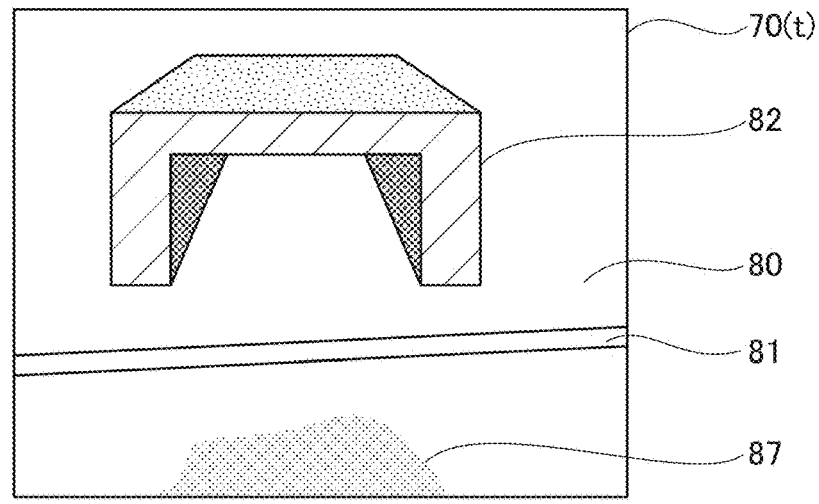
FIG. 6A shows an example of an original image captured by a front camera.

The original image 70(t) in FIG. 6A is a captured image of a road surface 80 in front of the vehicle 10 (FIG. 1). A lane marker 81 is drawn on the road surface, and a garage 82 (a three-dimensional object) for parking the vehicle 10 is located behind the lane marker 81. The garage 82 has leg portions 83, 85 on the left and the right sides of the garage 82, respectively. Note that a vehicle shadow 87 which is the shadow of the vehicle 10 is shown in the bottom of the original image 70(t).

Figure 6B:
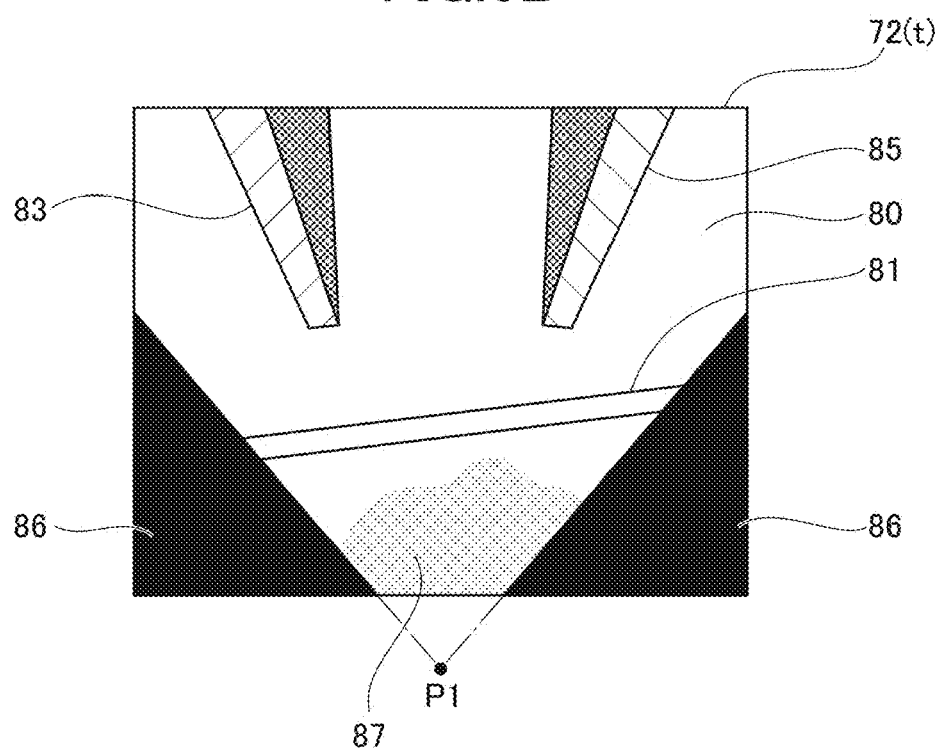
FIG. 6B shows an example of a virtual image (overhead image) converted from the image of FIG. 6A and viewed from directly above.

The image convertor 30 converts the original image 70(t) shown in FIG. 6A into the virtual image 72(t) (overhead image or bird's-eye view image) viewed from directly above the vehicle 10 as shown in FIG. 6B. Though the conversion method is not described in detail, the virtual image 72(t) is obtained by performing the coordinate conversion on the original image 70(t) using installation layout information (a height of the camera, a depression angle of the camera, lens parameters) of the front camera 12a (FIG. 4). The coordinate conversion is to be projected to the road surface on which the vehicle 10 is located. Note that the virtual image converted from the original image 70(t) is indicated with 72(t).

During the generation of the virtual image 72(t), in the garage 82 (the three-dimensional object) shown on the original image 70(t) captured by the front camera 12a, the left and right leg portions 83, 85 are projected as deformed on the virtual image 72(t). Specifically, the left and right leg portions 83, 85 are projected to be inclined toward the road surface in a direction away from the vehicle 10 as the leg portions 83, 85 go upward. In other words, the leg portions 83, 85 are projected to be deformed such that a width between the leg portions 83, 85 becomes wider in the top of the virtual image 72(t). The deformation of the leg portions 83, 85, that is, the deformation in areas each having a height from the road surface occurs to spread radially toward the periphery of the virtual image 72(t) from a installation position P1 (FIG. 6B) of the front camera 12a (FIG. 4).

Further, invisible areas 86, 86, which are outside the field of view of the front camera 12a, are generated in the virtual image 72(t). Accordingly, predetermined gray values (0, for example) are stored in the invisible areas 86, 86.

(Outline Description of the Three-Dimensional Object Detection Process)

Next, with reference to FIG. 3 and FIGS. 7A to 7E, the operation of the three-dimensional object detection process is described. The three-dimensional object detection process is performed in the three-dimensional object detector 40 in FIG. 3.

Figure 7A:
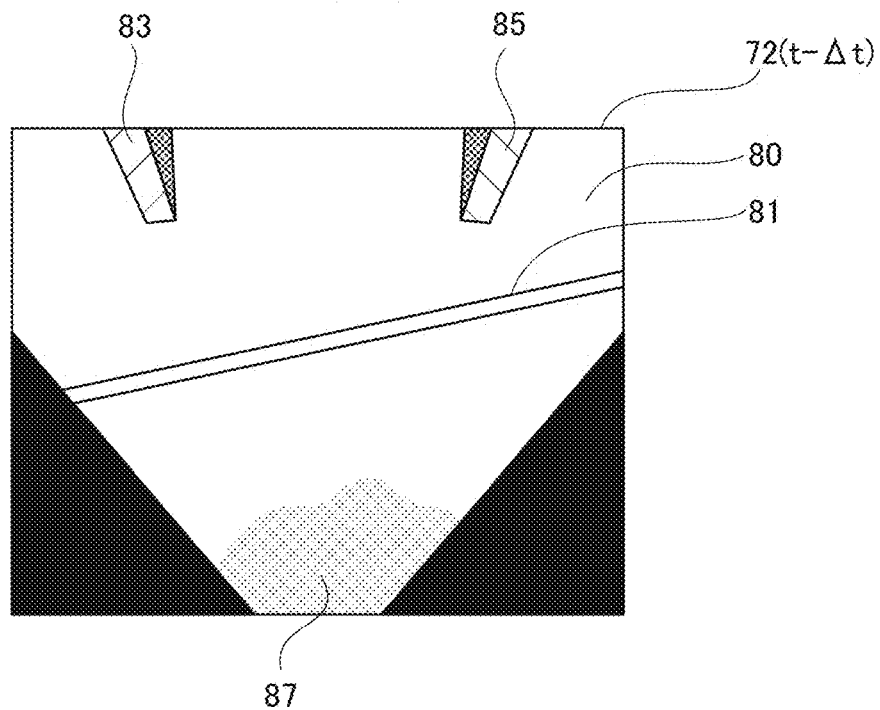
FIG. 7A is a view illustrating the operation of a three-dimensional object detection process, and shows an example of a virtual image (overhead image) converted from an original image captured at time $t-\Delta t$.
Figure 7B:
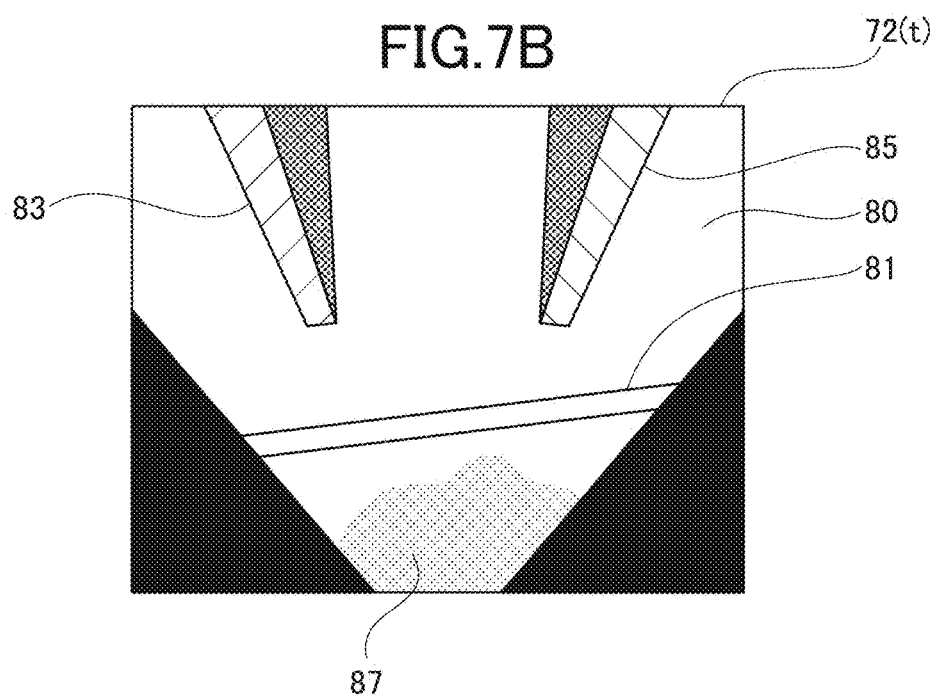
FIG. 7B is a view illustrating the operation of the three-dimensional object detection process, and shows an example of a virtual image (overhead image) converted from an original image captured at time t.

As shown in FIGS. 7A, 7B, the three-dimensional object detector 40 detects three-dimensional objects from the virtual images respectively generated from two original images that are captured at a time interval $\Delta t$. In this embodiment, the description is made as the three-dimensional objects are to be detected from the virtual image 72(t) generated from the original image 70(t) captured at time t, and the virtual image 72(t–$\Delta t$) generated from the original image 70(t–$\Delta t$) captured at time t–$\Delta t$.

Figure 7C:
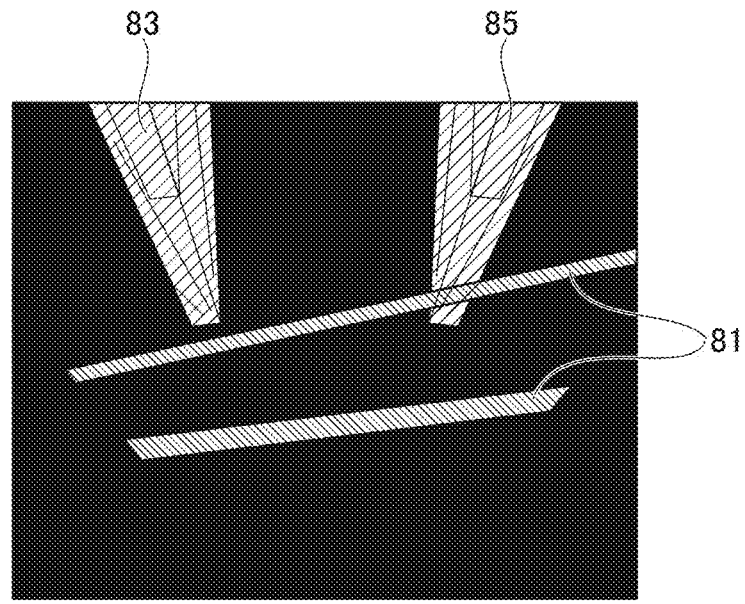
FIG. 7C is a view illustrating an example of performing a frame difference (first frame difference) for subtracting a virtual image at time $t-\Delta t$ from a virtual image at time t.

First, as shown in FIG. 7C, a frame difference of the two virtual images 72(t), 72(t–$\Delta t$) is calculated. This process is performed in the first frame difference calculator 40a shown in FIG. 3.

Figure 7D:
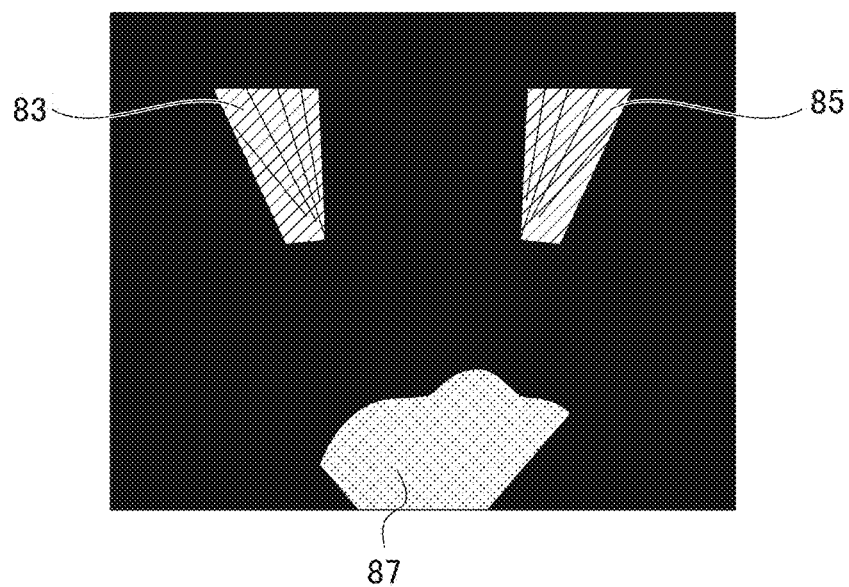
FIG. 7D is a view illustrating an example of performing a frame difference (second frame difference) for subtracting a virtual image at time t expected based on the virtual image at time $t-\Delta t$ from the virtual image at time t.

Then, as shown in FIG. 7D, the virtual image 72(t) at time t is expected from the virtual image 72(t–$\Delta t$) to generate an expected virtual image 72'(t). A frame difference of the expected virtual image 72'(t) and the virtual images 72(t) actually obtained at time t is calculated. This process is performed in the second frame difference calculator 40b shown in FIG. 3.

Specifically, the expected virtual image 72'(t) is generated as follows. The vehicle condition sensor 140 (FIG. 4) measures the traveling amount and the moving direction of the vehicle 10 for the time interval $\Delta t$ whenever necessary. Then, the virtual image 72(t–$\Delta t$) is translated and rotated to correspond to the measured traveling amount and moving direction for the time interval $\Delta t$, and accordingly, the expected virtual image 72'(t) at time t is generated. At this time, the expected virtual image 72'(t) is generated on the assumption that the whole road surface is reflected on the virtual image 72(t–$\Delta t$).

Note that the frame difference in the second frame difference calculator 40b may be performed between the expected virtual image 72'(t–$\Delta t$) and the virtual image 72(t–$\Delta t$) actually obtained at time t–$\Delta t$, after generating the expected virtual image 72'(t–$\Delta t$) at time t–$\Delta t$ based on the virtual image 72(t) at time t.

Performing the frame deference between the virtual image 72(t) and the expected virtual image 72'(t) matches positions of patterns drawn on the road surface such as the lane marker 81 shown in FIG. 7B. Accordingly, the lane marker 81 can be restrained or deleted as shown in FIG. 7D. On the other hand, the vehicle shadow 87 on the road surface is formed in the substantially same positions even when the vehicle 10 moves during a short time interval for which the frame difference is performed. As a result, the vehicle shadow 87 cannot be deleted with the frame difference between the virtual image and the expected virtual image as shown in FIG. 7D.

As opposed to above, the vehicle shadow 87 formed in the substantially same positions can be deleted as shown in FIG. 7C with the frame difference of the two virtual image 72(t), 72(t–Δt) actually obtained at two different times. Patterns drawn on the road surface such as the lane marker 81 cannot be deleted with this frame difference since an observation position moves as the vehicle moves.

Here, a result of the frame difference performed in the first frame difference calculator 40a (FIG. 7C) is compared with a result of the frame difference performed in the second frame difference calculator 40b (FIG. 7D).

First, when areas having substantially same features (shapes, for example) are not detected with the frame difference in the first frame difference calculator 40a in vicinity to areas detected as a result of the frame difference in the second frame difference calculator 40b, the areas detected with the frame difference in the second frame difference calculator 40b can be presumed as the vehicle shadow 87 on the road surface or reflections that occur on the road surface by the sun or the lighting lamp. Then, the areas are deleted since the areas are determined not to represent three-dimensional objects.

Next, in remaining areas after the above determination, only areas inclined toward the road surface in the direction away from the vehicle 10 are detected as three-dimensional objects each having a height from the road surface. Specifically, in the example of FIGS. 7C, 7D, only the leg portions 83, 85 are detected.

Figure 4:
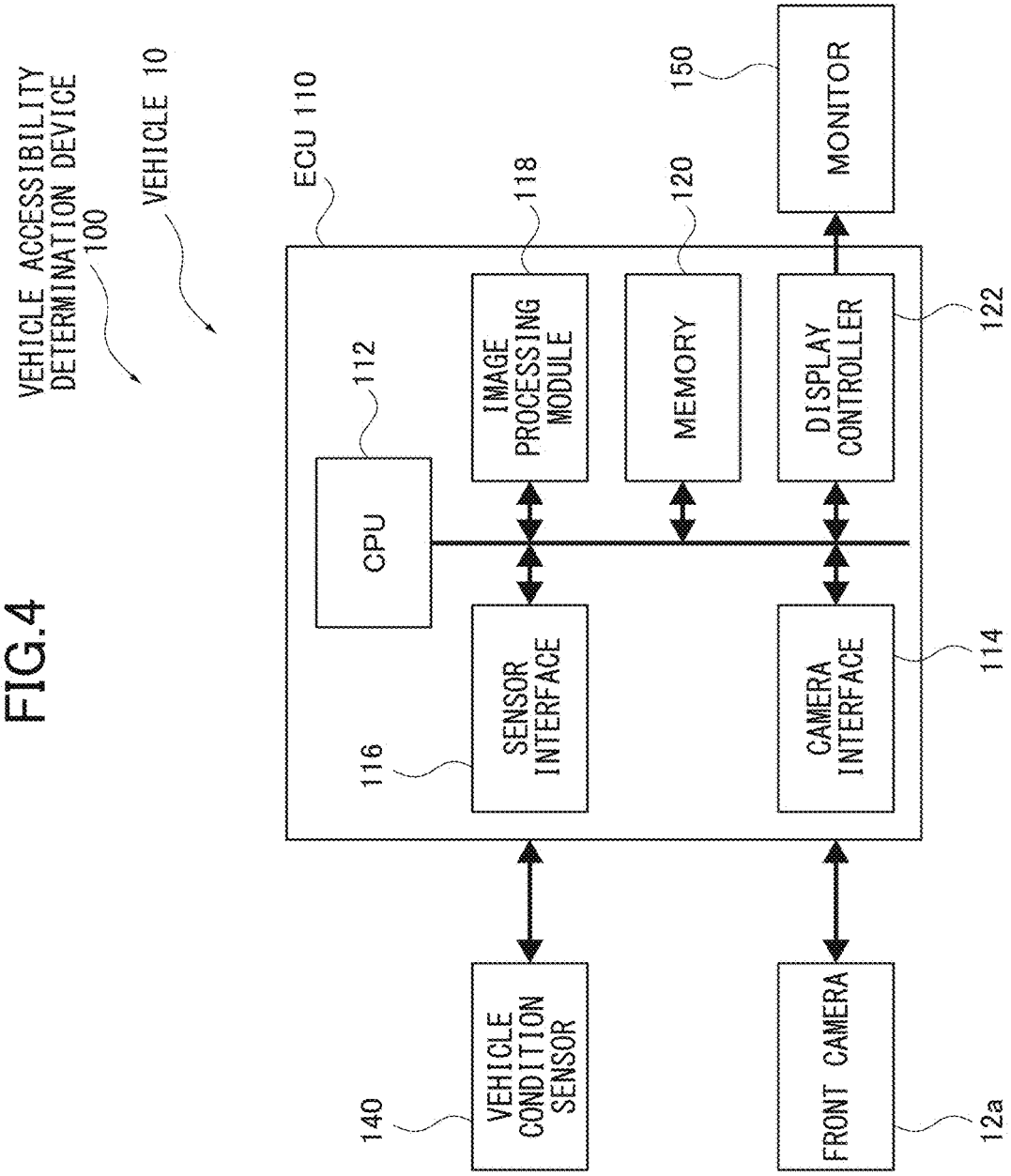
FIG. 4 is a hardware block diagram illustrating a hardware configuration of the vehicle accessibility determination device according to the first embodiment.

The fact that the areas obtained as a result of the frame differences are inclined toward the road surface in the direction away from the vehicle 10 can be determined by referring to a result of an edge detection from the vertical image 72(t) and by confirming that edge directions in the areas obtained as a result of the frame differences extend along radial lines through the installation position P1 (FIG. 6B) of the front camera 12a (FIG. 4).

(Detailed Description of Three-Dimensional Object Detection Process)

Figure 7E:
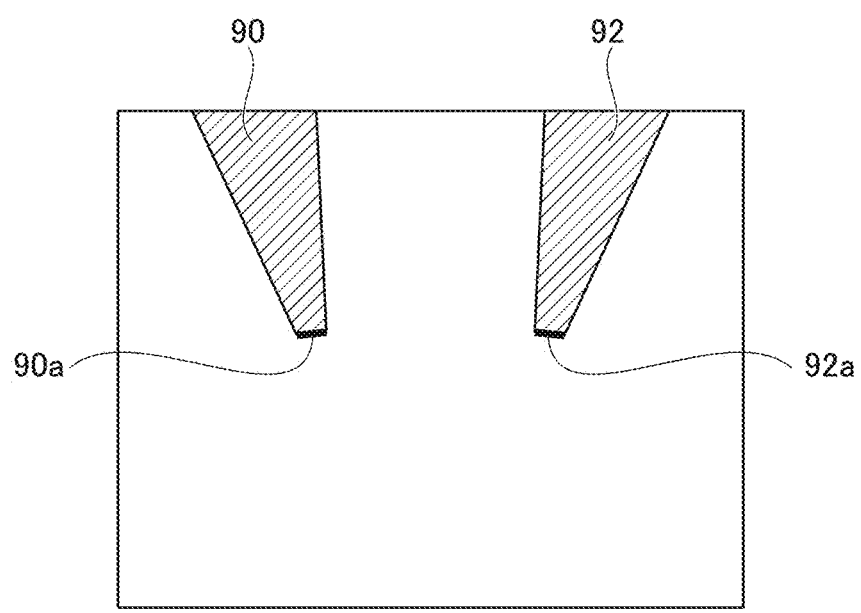
FIG. 7E shows an example of a result of detecting a three-dimensional object region.

Next, the three-dimensional object detection process is specifically described with reference to FIGS. 7C to 7E.

First, a result of the first frame difference shown in FIG. 7C is binarized with a predetermined threshold value, and pixels having gray values larger than the threshold value are detected as first three-dimensional object candidate areas (not shown). This process detects areas such as the leg portions 83, 85 and/or the lane marker 81.

Next, a result of the second frame difference shown in FIG. 7D is binarized with a predetermined threshold value, and pixels having gray values larger than the threshold value are detected as second three-dimensional object candidate areas (not shown). This process detects areas such as the leg portions 83, 85 and/or the vehicle shadow 87.

Only areas having same shapes (features) and located in close positions relative to the detected first and second three-dimensional object candidate areas are selected. That is, so called deletion of non three-dimensional objects is performed. This process can delete non three-dimensional objects whose positions are moved as the vehicle moves. Specifically, the areas of the lane marker 81 and/or the vehicle shadow 87 can be deleted. The deletion of the non three-dimensional objects can be carried out, for example by performing a logical AND operation on the detected first and second three-dimensional object candidate areas.

Note that features used in this embodiment are not limited to shapes of the areas. Specifically, areas located in close positions relative to each other may be detected using the luminance differences of the areas. Further, as features, similarity (similarity in edge directions, edge intensity) obtained as a result of performing the edge detection on the virtual images may be used. Also, similarity of a histogram of the edge detection result or a density histogram obtained from each of a plurality of small blocks made by dividing the virtual images, or the like may be used.

Next, the edge detector 40c (FIG. 3) performs an edge detection on the vertical image 72(t). The edge detection is performed by calculating difference in brightness between adjacent pixels as generally performed.

Relative to remaining areas after the deletion of the non three-dimensional objects, a direction in which each of the areas extends is evaluated by referring to a result of the edge detection of the pixels in the same positions as the remaining areas. The areas constituting the three-dimensional objects are converted to areas radially extending from the installation position P1 (FIG. 6B) of the front camera 12a (FIG. 4) toward the periphery of the virtual image 72(t). Accordingly, the areas constituting the three-dimensional objects are determined by confirming the shapes of the areas and/or the extending directions to meet the above condition.

At this time, the areas detected with the frame differences are not directly determined as the three-dimensional areas, but the edge detection result of the virtual image 72(t) is referred. Accordingly, the influence of the time variation of the exposure characteristic of the camera, shadows, lighting, which may be mixed in the results of the frame differences, can be reduced. In addition, since the edge detection result of the virtual image 72(t) is referred, the three-dimensional object area at time t–Δt may not be left as afterimages, and an erroneous detection is suppressed in the case where the three-dimensional objects move. Accordingly, the detection performance of the three-dimensional objects can be further improved.

The three-dimensional object areas 90, 92, which are considered to constitute three-dimensional objects, are detected with a series of the processes. Then, the lowermost edge positions of the detected three-dimensional object areas 90, 92 are detected as road surface grounding positions 90a, 92a. The road surface grounding positions 90a, 92a represent positions where the three-dimensional objects are in contact with the road surface.

(Description of a Flow of Three-Dimensional Object Detection Process)

Figure 8:
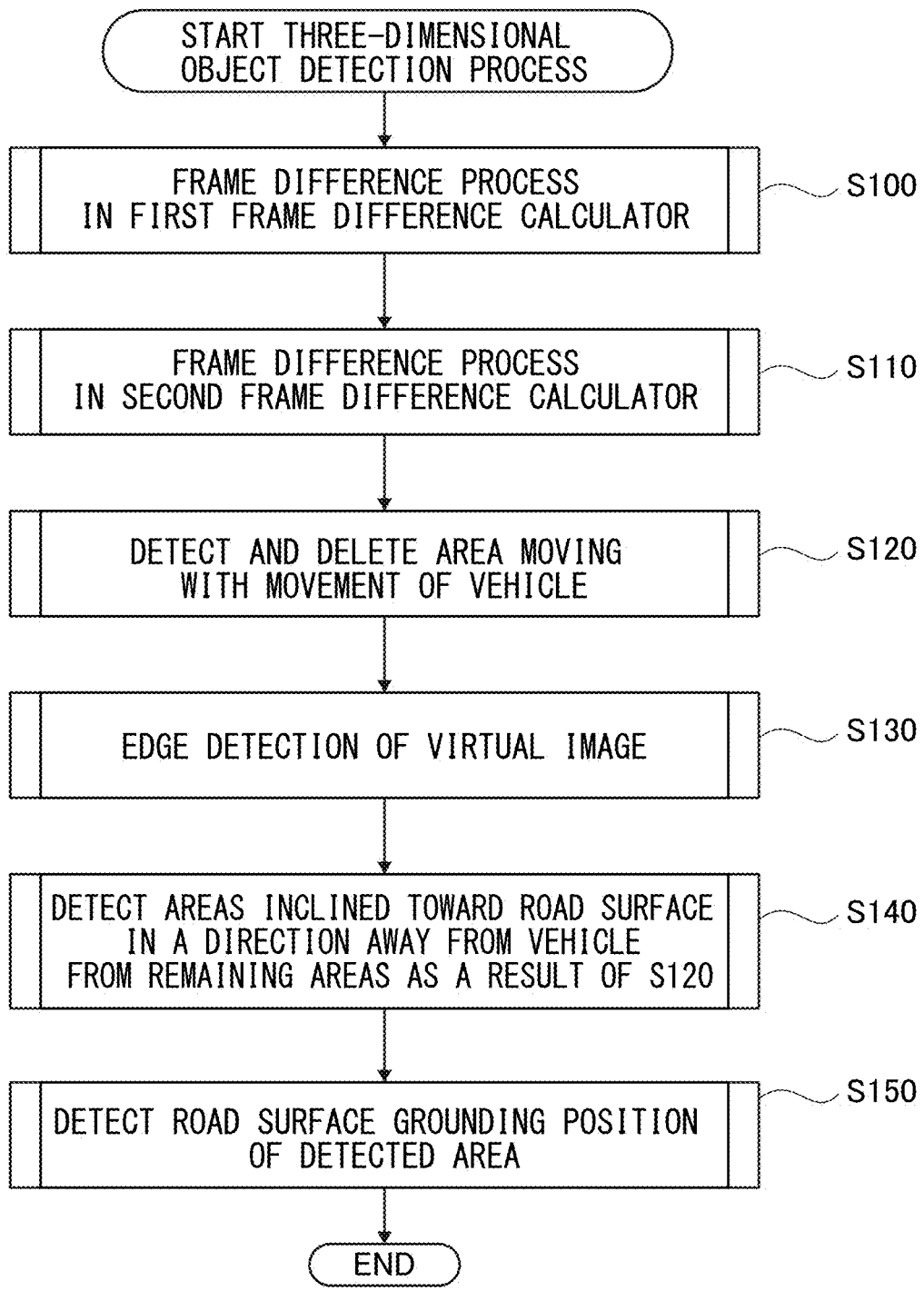
FIG. 8 is a flowchart illustrating a flow of a three-dimensional object detection process.

Next, a flow of the three-dimensional object detection process is described with reference to a flowchart of FIG. 8.

(Step S100)
The frame difference is performed in the first frame difference calculator 40a.

(Step S110)
The frame difference is performed in the second frame difference calculator 40b.

(Step S120)
A result of Step S100 is compared with a result of Step S110, and areas moving with the movement of the vehicle 10 are deleted as the non three-dimensional objects.

(Step S130)
The edge detection is performed on the virtual image 72(t).

(Step S140)

In the remaining areas as a result of Step S120, only areas inclined toward the road surface in the direction away from the vehicle 10 are detected.

(Step S150)

Road surface grounding positions of the detected areas are detected.

(Description of Three-Dimensional Object Area Extraction Process)

Next, relative to the three-dimensional objects detected from the virtual image 72 (overhead image), areas corresponding to the detected three-dimensional objects are extracted from the original image 70. Hereinafter, the operation of the three-dimensional object area extraction process is described with reference to FIGS. 9A to 9C.

Figure 9A:
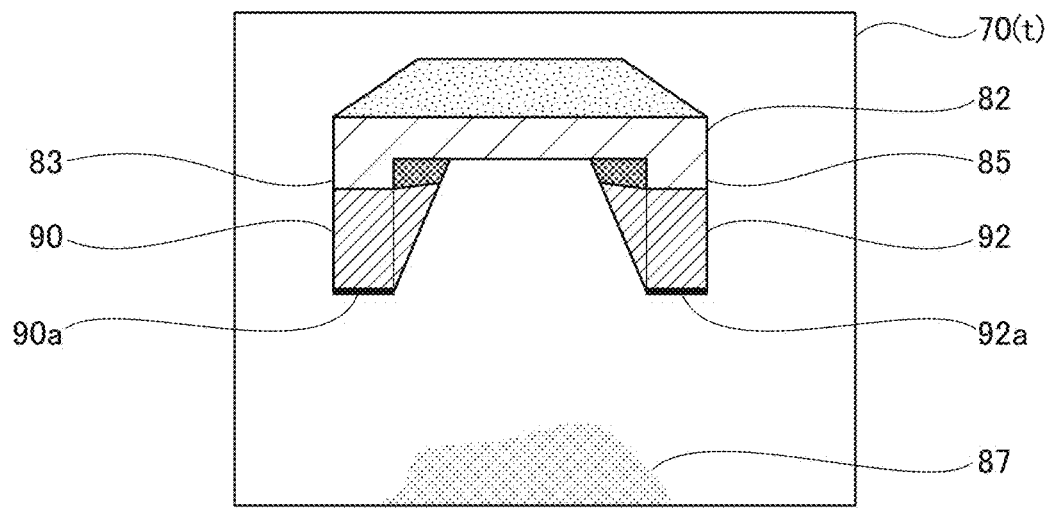
FIG. 9A is a view illustrating the operation of a three-dimensional object area extraction process, in which an area representing the detected three-dimensional object by the three-dimensional object area extraction process is superimposed on the original image.

Contrary to the case where the virtual image 72 is created, a reverse overhead view conversion is performed on the three-dimensional object areas detected from the virtual image 72 to convert the areas into the coordinate system of the original image 70. The reverse overhead view conversion identifies the three-dimensional object areas in the original image 70(t) as shown in FIG. 9A. However, in the case of FIG. 9A, upper portions of the garage 82 (three-dimensional object) are framed out when converted into the virtual image. Accordingly, only the three-dimensional object areas 90, 92, which are lower portions close to the ground surface, are extracted and superimposed. Since the gray value stored in the original image 70 is used in a subsequent process, the superimposition in this embodiment means to superimpose another layer on the original image 70.

Figure 9B:
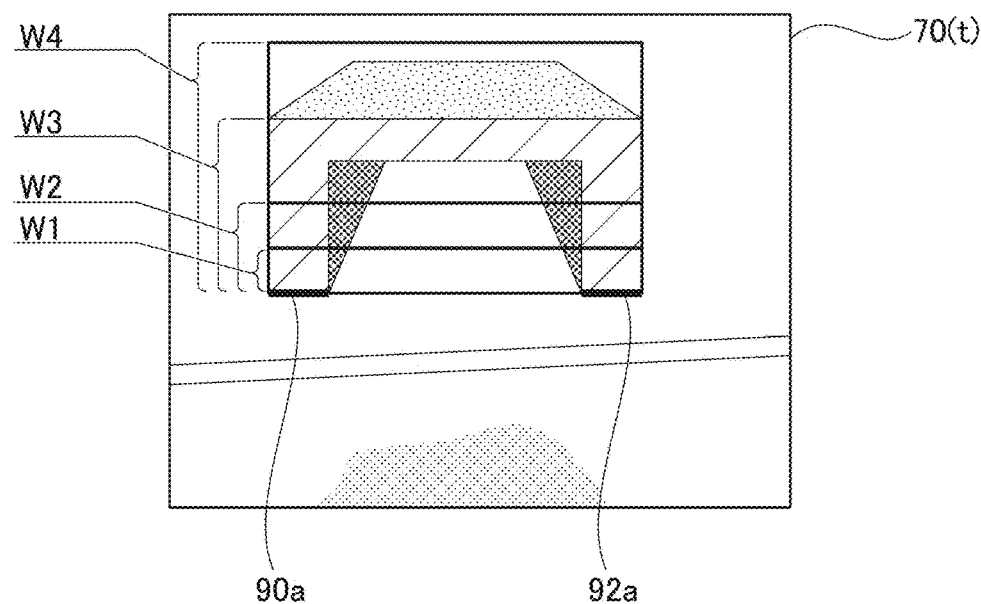
FIG. 9B is a view illustrating windows set on the original image to evaluate a density distribution and to identify the three-dimensional object area.

Next, as shown in FIG. 9B, a rectangular area W1 is set in the original image 70(t). The outer edge of the rectangular area W1 contacts the outer edges of the three-dimensional object areas 90, 92 in a lateral direction. The vertical size of the rectangular area W1 is set to a preset predetermined value. Then, the three-dimensional object area extracting portion 50a creates a density histogram H (W1) in the area of the original image 70(t) corresponding to the rectangular area W1. An example of the density histogram H (W1) created as above is shown in FIG. 9C.

Figure 9C:
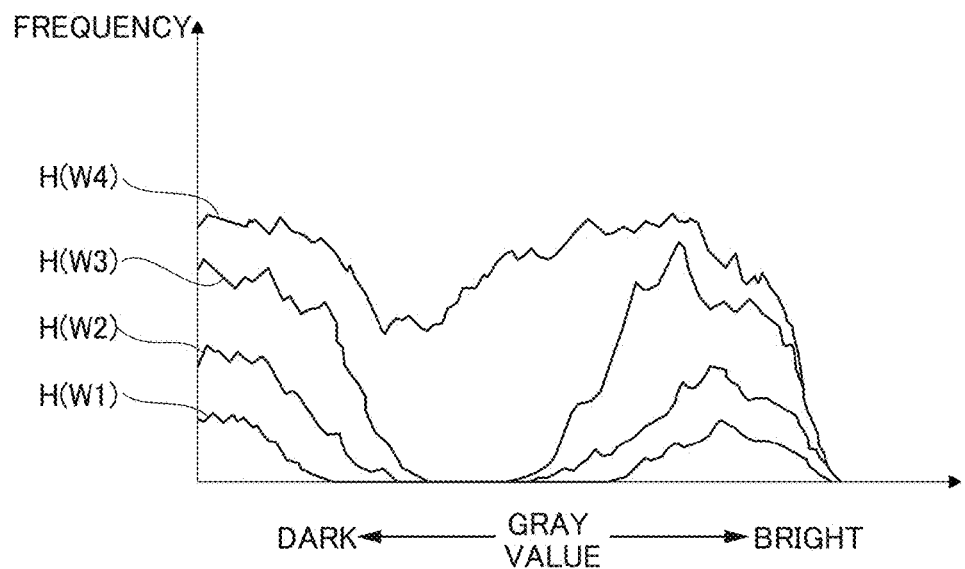
FIG. 9C is a graph illustrating an example of a density histogram in each of the windows shown in FIG. 9B.

As can be seen from FIG. 9C, the density histogram H (W1) includes two areas, namely a dark area and a bright area. The dark area forms three-dimensional object areas 90, 92 and the bright area forms non-three-dimensional object areas.

Then, rectangular areas W2, W3, and W4 are set by increasing the vertical size of the rectangular area W1 by a predetermined value, and the density histograms H (W2), H (W3), and H (W4) of the original image 70(t) corresponding to each of the rectangular areas are created each time the rectangular area is set. Examples of the density histograms H (W2), H (W3), and H (W4) created as above are shown in FIG. 9C.

As can be seen from FIG. 9C, when the rectangular areas and the three-dimensional object areas 90, 92 overlap, the density histograms have similar forms. Specifically, in the example of FIG. 9C, from the density histograms H (W1), H (W2), and H (W3) obtained when the rectangular areas W1, W2, and W3 are set, it can be noticed that two areas, that is the dark area forming the three-dimensional object areas 90, 92 and the bright area forming the non-three-dimensional object areas appear. Then, with regard to the density histogram H (W4) obtained when the rectangular area W4 completely overlaps the three-dimensional object areas 90, 92, the similarity of the density distribution to the others is disrupted.

In this embodiment, as shown in FIG. 9C, a plurality of rectangular areas Wi (i=1, 2, . . . ), each having a different vertical size, are set; the density histograms H (Wi) in the rectangular areas Wi are created; similarities of the created density histograms H (Wi) are evaluated; and areas corresponding to the three-dimensional objects are extracted from the original image 70(t).

Note that as a measure for evaluating similarities in the density histograms H (Wi), various methods such as a Euclidean distance determination method, a histogram intersection method, or the like have been proposed and may be used to evaluate the similarities. However, since the sizes of the rectangular areas Wi (i=1, 2, . . . ) to be set are different from each other, an area (dimension) of each of the created density histograms H (Wi) differs from each other. Therefore, in order to calculate the similarities, it is necessary to perform a normalization process in advance so that the areas (dimensions) of the density histograms H (Wi) become equal. The similarities in the density histograms H (Wi) may be evaluated based on a mode method assuming bimodality of the histograms, stability of binarization threshold by discriminant analysis, or the like, by considering variations in the area (dimension) of the three-dimensional object areas and the non-three-dimensional object areas in the rectangular areas Wi.

In addition, the rectangular areas Wi (i=1, 2, . . . ) contacting the three-dimensional object areas 90, 92 (FIG. 9A) are set in the example of FIG. 9B. This is because it is assumed that there are floating areas in the air between the three-dimensional object areas 90 and 92.

Therefore, it is possible to set areas contacting the three-dimensional object areas 90, 92, respectively, and to obtain the two three-dimensional object areas. However, in that case, after extracting the three-dimensional object areas respectively, it is determined whether these three-dimensional object areas are one mass or not. This determination is made by, for example, the similarity evaluation of the density histograms as the extraction of the three-dimensional object areas described above. If the areas are one mass, it is necessary to be integrated as one area.

Figure 10:
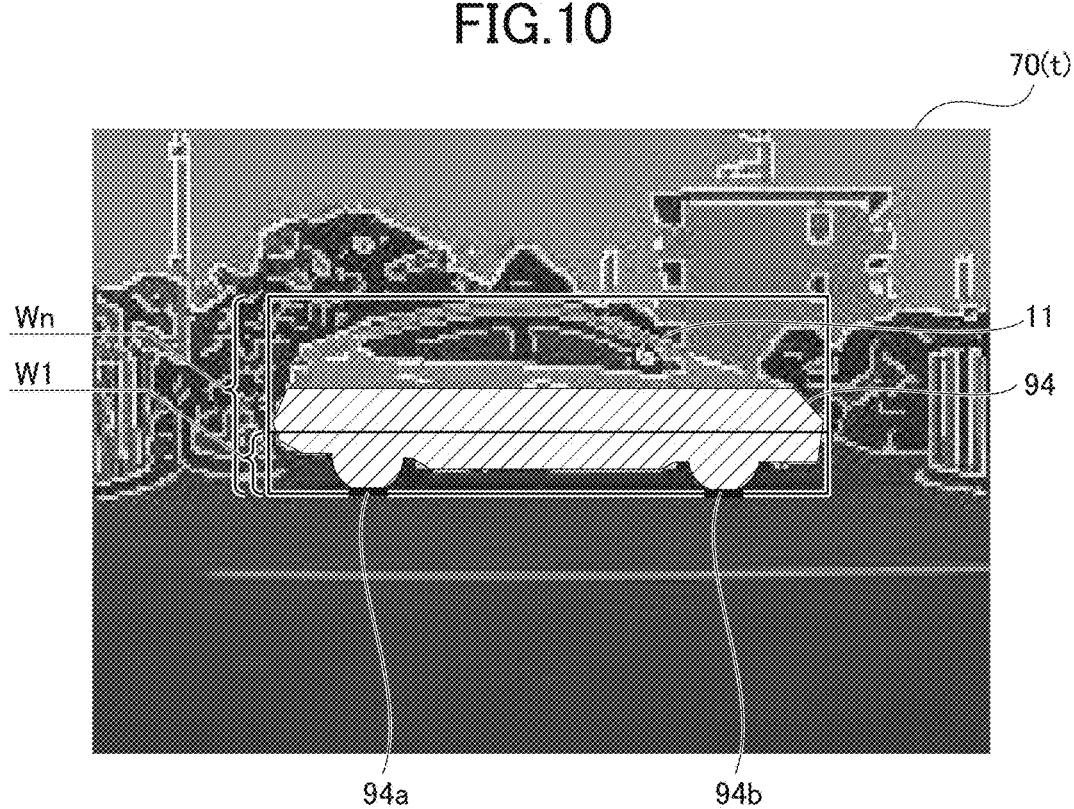
FIG. 10 is a view illustrating another example of extracting a three-dimensional object region.

Next, another example of extracting three-dimensional object areas is described with reference to FIG. 10. FIG. 10 is an original image 70(t) captured at time t and showing a condition in which another vehicle 11 (three-dimensional object) is parked in front of the vehicle 10. FIG. 10 also shows a condition in which a three-dimensional object area 94 detected by the three-dimensional object area detection is superimposed to the original image 70(t). Locations on which tires of vehicle 11 (three-dimensional object) are grounded are detected as road surface grounding positions 94a, 94b.

The three-dimensional object area extraction process described above is performed on the original image 70(t) shown in FIG. 10. That is, the rectangular areas Wi (i=1, . . . , N) contacting the three-dimensional object area 94 are set, and similarities of the density histograms H (Wi) are evaluated. Thereby, the rectangular area Wn contacting vehicle 11 can be extracted.

(Description of a Flow of Three-Dimensional Object Area Extraction Process)

Next, a flow of the three-dimensional object area extraction process is described with reference to a flowchart of FIG. 11.

(Step S200)

The three-dimensional object areas detected from the virtual image 72 are inversely converted and superimposed on the corresponding positions in the original image 70.

(Step S210)

A plurality of rectangular areas Wi (i=1, 2, . . . ) are set as three-dimensional object candidate areas. The rectangular areas Wi contact in a lateral direction the three-dimensional object areas superimposed on the original image 70.

(Step S220)

The density histograms H (Wi) are created with regard to areas corresponding to the rectangular areas Wi from the original image 70.

(Step S230)

Similarities of the created density histograms H (Wi) are calculated to find a set of the density histograms H (Wi) having a high degree of similarity. Then, in the set of the density histograms H (Wi) determined to have the high degree of similarity, a rectangular area Wi having the maximum vertical size is set as the three-dimensional object area.

(Step S240)

It is determined whether the three-dimensional object area is set or not. The process of FIG. 11 ends when the three-dimensional object area is set. Otherwise, the process returns to Step S210 to repeat the process for another three-dimensional object candidate area.

Figure 11:
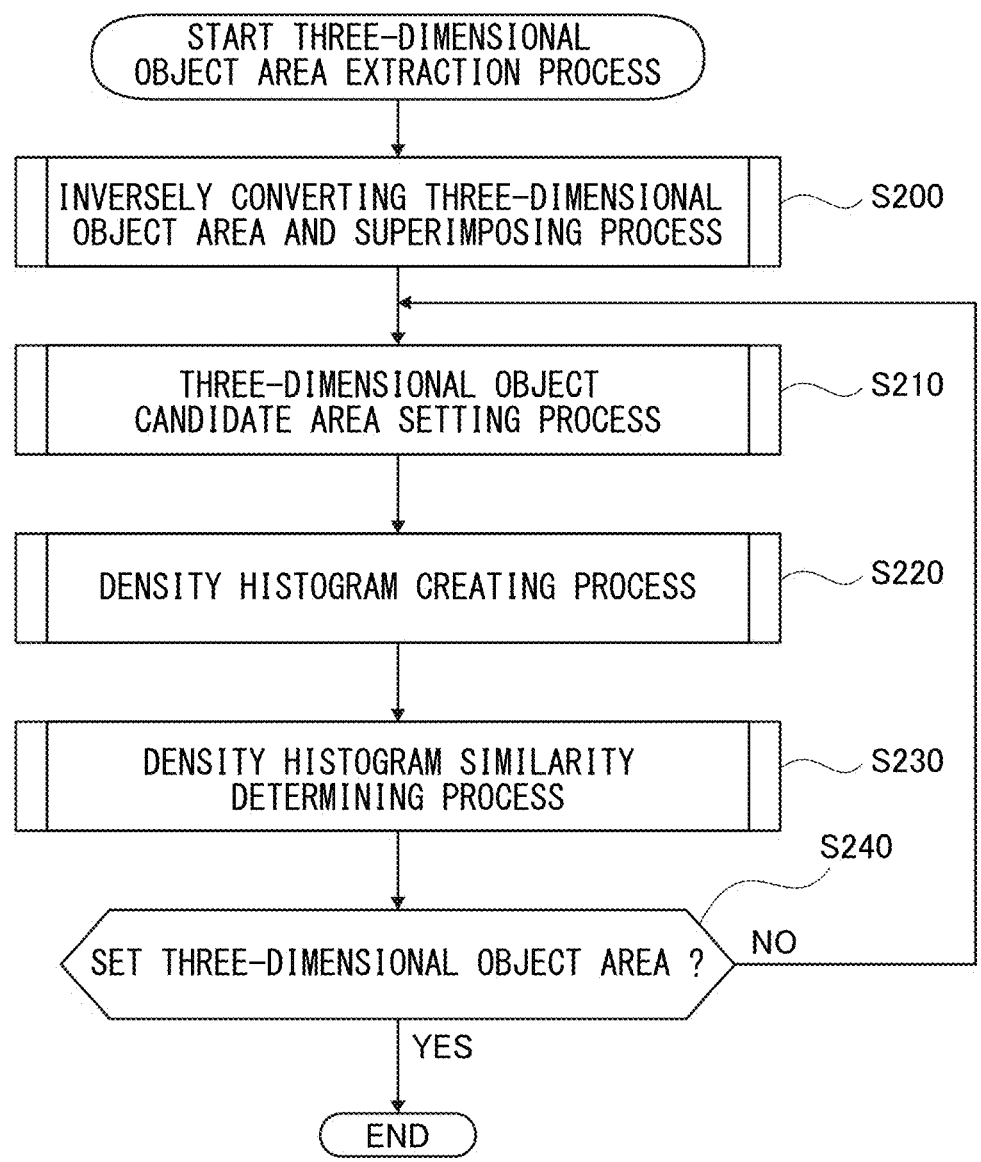
FIG. 11 is a flowchart illustrating a flow of a three-dimensional object area extraction process.

FIG. 11 shows an example of a three-dimensional object area extraction process. Actually, the three-dimensional object areas may be extracted using another characteristic such as the edge detection result of the virtual image, or the like, in addition to using similarities of the density histograms H (Wi) of the areas as described above.

(Description of Vehicle Accessibility Determination Process)

Figure 12A:
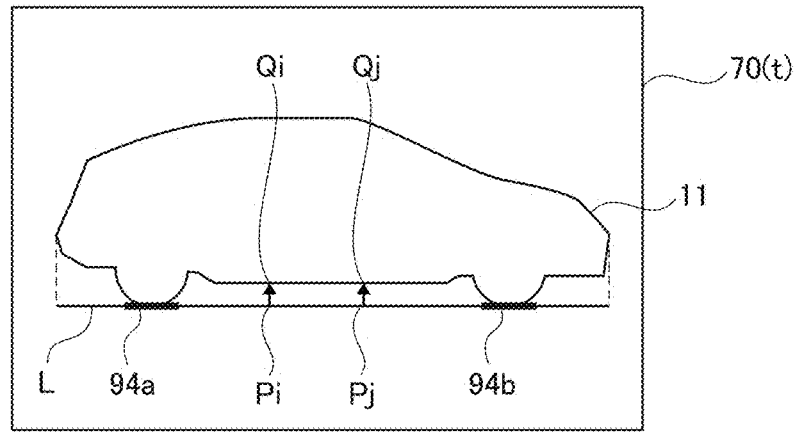
FIG. 12A is a first view illustrating the operation of a vehicle accessibility determination process, and a process for calculating a road surface projecting position, in which the three-dimensional object is projected to the road surface from directly above.
Figure 12B:
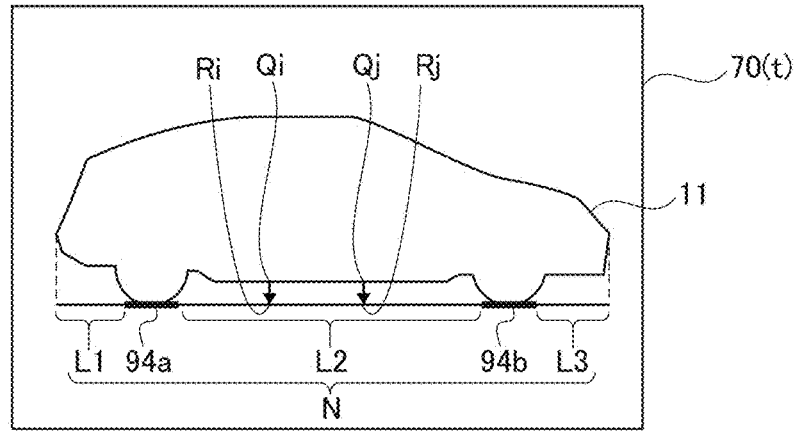
FIG. 12B is a second view illustrating the process for calculating the road surface projecting position, in which the three-dimensional object is projected to the road surface from directly above.

Next, the operation of the vehicle accessibility determination process is described with reference to FIGS. 12A to 12C. The vehicle accessibility determination process is performed in the vehicle accessibility determiner 50 shown in FIG. 1.

Three-dimensional objects on the road surface do not necessarily contact the road surface at their bottom portions thereof. Specifically, there are three-dimensional objects each having a floating area which does not contact the road surface. For example, with regard to the garage 82 (three-dimensional object) shown in FIGS. 6A, 6B, only the leg portions 83, 85 contact the road surface, but an area between the leg portions 83, 85 are floating above the road surface. With regard to the other vehicle 11 (three-dimensional object) shown in FIG. 10, only tires contact the road surface but the other portion (the body of the vehicle) are floating above the road surface.

Accordingly, in the vehicle accessibility determination process, a road surface projecting position, in which the other vehicle 11 is projected to the road surface from directly above, is calculated. The other vehicle 11 is a three-dimensional object area extracted in the three-dimensional object area extraction process. This process is performed in the road surface projecting position calculating portion 50b. The process can detect whether the extracted three-dimensional object area includes portions floating above the road surface.

The detection of the floating portions is performed as follows. As shown in FIG. 12A, a line segment L is set. The line segment L extends between the left end and the right end of the other vehicle 11, which is the detected three-dimensional object area. The other vehicle 11 also includes the road surface grounding positions 94a, 94b. Then, the positions of points, which are above the line segment L and contacting the other vehicle 11 on the original image 70(t), are detected. As a result of the process, in the example of FIG. 12A, for example, when a search is performed from a point Pi, a point Qi which floats in a space is detected. Similarly, when the search is performed from a point Pj, a point Qj which floats in the space is detected. Note that the road surface grounding positions 94a, 94b are excluded from the object of the process since the road surface grounding positions 94a, 94b are in contact with the road surface.

Next, the detected points Qi, Qj, . . . which float in the space are projected inversely on the line segment L to set road surface grounding points Ri, Rj, . . . . Note that the road surface grounding positions 94a, 94b remain as road surface grounding points.

The road surface grounding points Ri, Rj, . . . set as described above represent the road surface projecting positions in which the other vehicle 11 (three-dimensional object) is projected to the road surface from directly above. Among the road surface grounding points Ri, Rj obtained as described above, the road surface grounding points detected continuously in left and right directions are connected to each other to create road surface grounding lines L1, L2, L3. The road surface grounding lines L1, L2, L3 are equal to one line segment. With this process, it can be understand that the vehicle 10 can move toward the other vehicle 11 until the vehicle 10 reaches at least the positions of the road surface grounding lines L1, L2, L3. The vehicle 10 may hit the other vehicle 11 when the vehicle 10 is moved to the other vehicle 11 beyond the road surface grounding lines L1, L2, L3.

The road surface grounding lines L1, L2 are connected to the road surface grounding position 94a, and the road surface grounding lines L2, L3 are connected to the road surface grounding position 94b. Therefore, the road surface grounding positions 94a, 94b and the road surface grounding lines L1, L2, L3 are unified as one road surface grounding line N.

Next, it is determined whether there is a space in the detected three-dimensional object area to which the vehicle 10 can access. This determination is performed in the vehicle accessible space identifying portion 50c shown in FIG. 1.

Figure 12C:
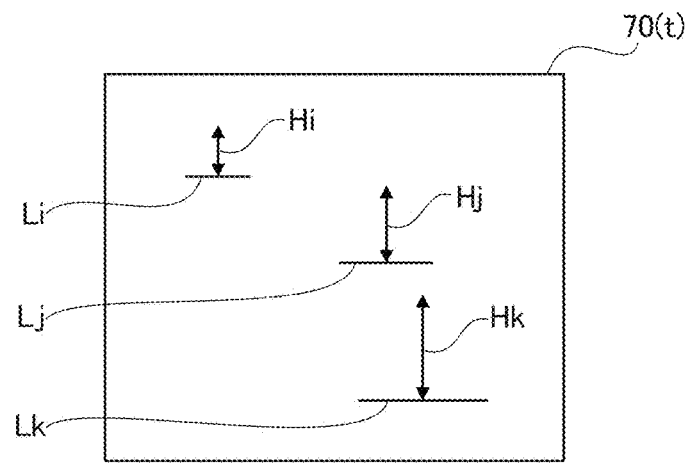
FIG. 12C is a view illustrating an example of a detection result of a road surface grounding line N representing the road surface projecting position of the three-dimensional object.

Specifically, for example, as shown in FIG. 12C, it is confirmed where three-dimensional object areas are floating above the road surface grounding lines Li, Lj, Lk (corresponding to the road surface grounding line N) detected in the original image 70(t).

That is, determination whether the vehicle 10 can farther move beyond the road surface grounding lines Li, Lj, Lk or not is performed by confirming that the length of each of the road surface grounding lines Li, Lj, Lk is longer than the width of the vehicle 10, and there are spaces higher than the height of the vehicle 10 above the road surface grounding lines Li, Lj, Lk.

Here, the original image 70(t) is generated by receiving a perspective conversion. That is, the farther the portions are located, the shorter the portions are reflected or shown in the upper part of the image. Therefore, actual lengths of the road surface grounding lines Li, Lj, Lk can be estimated with the vertical positions and the lengths of the road surface grounding lines Li, Lj, Lk on the original image 70(t), which are detected in the original image 70(t). Further, the heights of spaces to which the vehicle 10 is accessible in the positions of the road surface grounding lines Li, Lj, Lk can be estimated with the vertical positions of the road surface grounding lines Li, Lj, Lk on the original image 70(t).

For example, as shown in FIG. 12C, when the road surface grounding lines Li, Lj, Lk are detected in the original image 70(t), the heights Hi, Hj, Hk of the spaces above each of the road surface grounding lines Li, Lj, Lk necessary for the vehicle 10 to access beyond each of the road surface grounding lines Li, Lj, Lk can be estimated based on the vertical positions of the road surface grounding lines Li, Lj, Lk.

Actual lengths of the road surface grounding lines Li, Lj, Lk and the heights Hi, Hj, Hk of the spaces above the road surface grounding lines Li, Lj, Lk can be respectively estimated based on installation layout information (the height of the camera, the depression angle of the camera, lens parameters) of the front camera 12a (FIG. 4). Specifically, since the installation layout of the front camera 12a is known in advance, the actual lengths of the respective road surface grounding lines L1, L2, L3, and the heights H1, H2, H3 of the spaces above the road surface grounding lines Li, Lj, Lk can be obtained in advance by calculation. Then, calculated values are stored in the form of a table in the vehicle accessible space identifying portion 50c (FIG. 1).

When the road surface grounding lines Li, Lj, Lk are detected, it can be determined whether each of the road surface grounding lines Li, Lj, Lk exceeds the width of the vehicle 10, and whether there are spaces exceeding the height of the vehicle 10 above the grounding lines Li, Lj, Lk by referring to the contents of the stored table.

(Description of a Flow of Vehicle Accessibility Determination Process)

Figure 13:
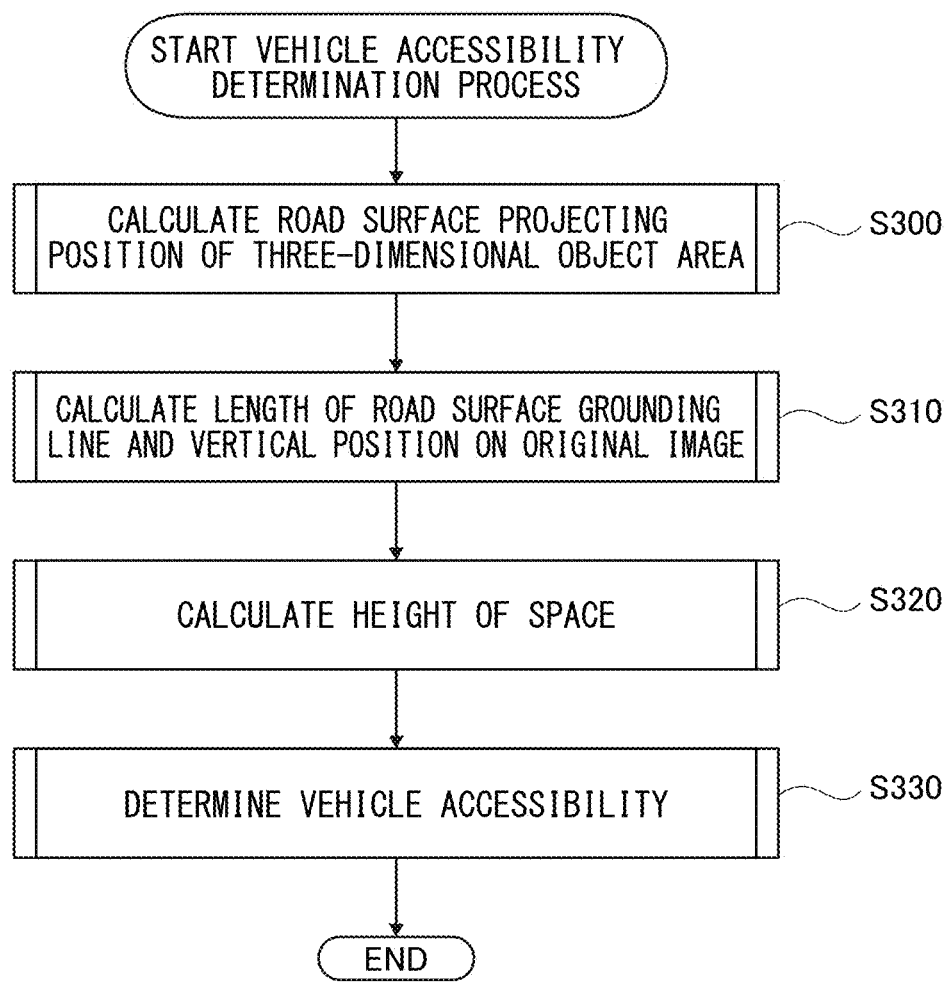
FIG. 13 is a flowchart illustrating a flow of a vehicle accessibility determination process.

Hereinafter, a flow of the vehicle accessibility determination process is described with reference to a flowchart of FIG. 13.

(Step S300)

The road surface projecting positions of the three-dimensional object areas are calculated as the road surface grounding points Ri, Rj . . . . The specific content of the process is as described above.

(Step S310)

Among the road surface grounding points Ri, Rj . . . , successively located points are unified as the road surface grounding line N. Then, the length of the road surface grounding line N, and the vertical position of the road surface grounding line N on the original image 70 are calculated.

(Step S320)

The height H of the space above the road surface grounding line N is calculated.

(Step S330)

It is determined whether the vehicle 10 can access beyond the road surface grounding line N or not.

(Description of Vehicle Inaccessible Range Display Process)

Next, the operation of the vehicle inaccessible range display process is described with reference to FIGS. 14A, 14B. The vehicle inaccessible range display process is performed in the vehicle accessible and inaccessible range display 60 shown in FIG. 1.

Figure 14A:
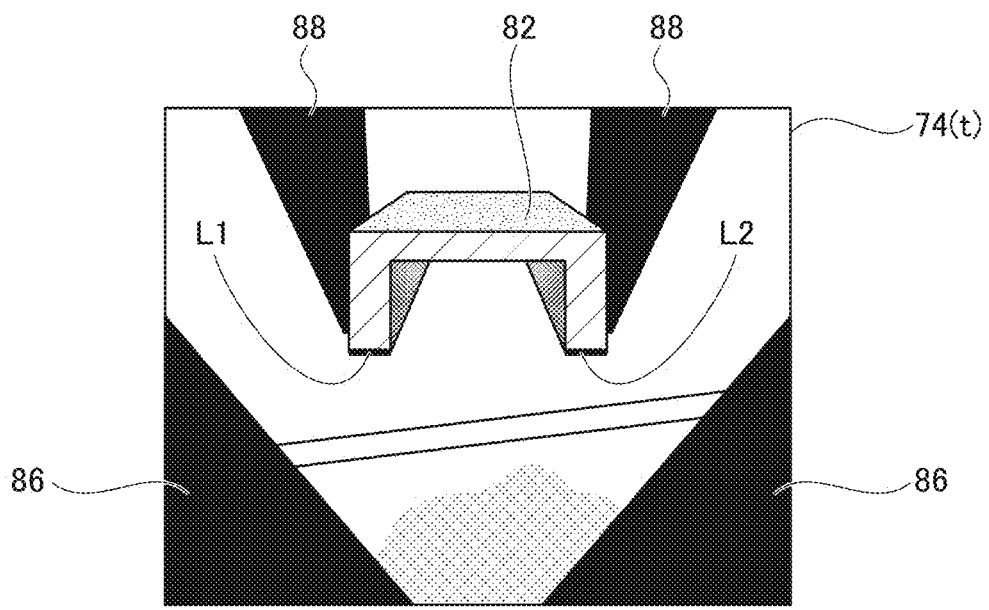
FIG. 14A is a first diagram showing a display example of a vehicle accessibility range.

FIG. 14A shows an example of a display image 74(t) generated from FIGS. 6A, 6B. The display image 74(t) is displayed in the monitor 150 (FIG. 4) of the vehicle 10. As shown in FIG. 14A, in the display image 74(t), the road surface grounding lines L1, L2 are drawn with bold lines on in the virtual image 72(t) (overhead view). In addition, in the display image 74(t), the three-dimensional object area corresponding to the extracted garage 82 is superimposed and displayed. Since the vehicle 10 can access to an area between the road surface grounding lines L1, L2, a bold line is not drawn in the position of a road surface grounding line. A driver of the vehicle 10 decides that the vehicle 10 can be farther moved to the rear side of the garage 82 (three-dimensional object) by seeing the display image 74(t). Note that predetermined colors such as red may be added to the bold lines which indicate the road surface grounding lines L1, L2 to improve visibility.

Note that in the display image 74(t), predetermined gray values (0, for example) are stored in the invisible areas 86 which are outside the field of view of the front camera 12a, and the invisible areas 88 which are the shadow of the garage 82 (three-dimensional object).

Figure 14B:
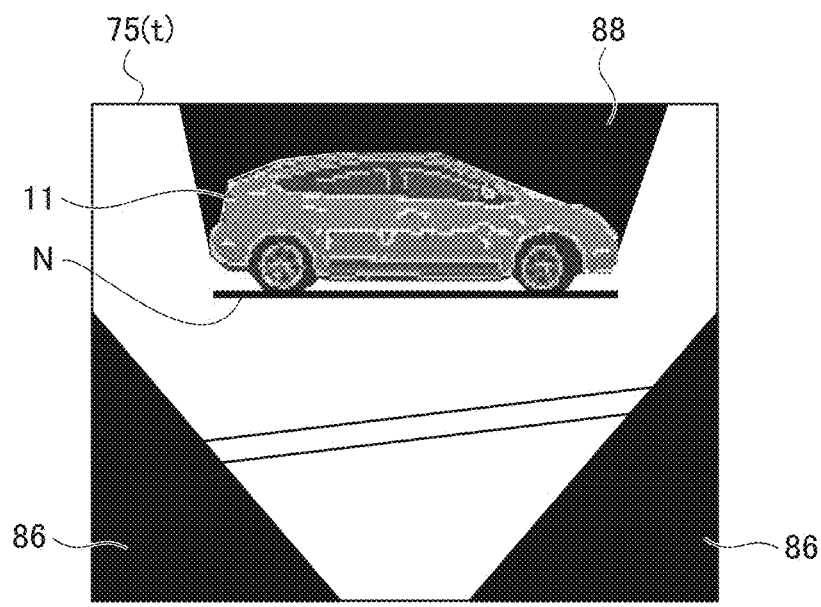
FIG. 14B is a second diagram showing a display example of the vehicle accessibility range.

FIG. 14B shows an example of a display image 75(t) generated when the original image 70(t) shown in FIG. 10 is observed. In display image 75(t), a bold line which indicates the road surface grounding line N is drawn below the other vehicle 11. It shows that the vehicle 10 can approach only to the position of the road surface grounding line N. In other words, it shows that the vehicle 10 cannot access beyond the road surface grounding line N.

It should be noted that the display form of the display image 74 (t) is not limited to the examples shown in FIGS. 14A, 14B. That is, in the road surface grounding line N, bold lines may be displayed relative to a range to which the vehicle 10 can access, not to a range to which the vehicle 10 cannot access.

As described above, according to the vehicle accessibility determination device 100 according to the first embodiment of the present invention as configured above, the image convertor 30 converts the original image 70 including the road surface around the vehicle 10 which is captured by the front camera 12a (imager 12) into the virtual image 72 (overhead image) viewed from a predetermined viewpoint. The three-dimensional object detector 40 detects from the virtual image 72 the three-dimensional object having a height from the road surface. The vehicle accessibility determiner 50 determines whether the vehicle 10 can access to the inside of the detected three-dimensional object or to a clearance among other three-dimensional objects. Accordingly, even if the three-dimensional object has a floating area which does not contact the road surface, it can be detected whether the vehicle 10 can access to the space or not. Therefore, it is possible to prevent the vehicle 10 from hitting the three-dimensional object in advance.

In addition, according to the vehicle accessibility determination device 100 according to the first embodiment of the present invention as configured above, the three-dimensional object area extracting portion 50a extracts an area corresponding to the three-dimensional object from the original image 70. The road surface projecting position calculating portion 50b calculates the presence or absence of a floating area that does not contact the road surface and the height of the floating area from the road surface relative to the three-dimensional object area extracted by the three-dimensional object area extracting portion 50a. The floating area constitutes the three-dimensional object. Also, the road surface projecting position calculating portion 50b calculates the road surface projecting position in which the floating area is projected to the road surface from directly above. The vehicle accessible space identifying portion 50c identifies whether there is the space inside the detected three-dimensional object or in the clearance among other three-dimensional objects to which the vehicle 10 can access, based on the presence or absence of the floating area and the road surface projecting position calculated by the road surface projecting position calculating portion 50b. Accordingly, the presence or absence of the floating area and the road surface projecting position can be calculated with a simple process.

Further, according to the vehicle accessibility determination device 100 according to the first embodiment of the present invention as configured above, the vehicle accessible and inaccessible range display 60 superimposes, to the road surface position of the virtual image 72, the vehicle inaccessible range to which the vehicle 10 cannot access determined in the vehicle accessibility determiner 50, or the vehicle accessible range to which the vehicle 10 can access determined in the vehicle accessibility determiner 50, and displays the superimposed ranges. Accordingly, it is possible to visualize how far the vehicle 10 can access to the three-dimensional object even if the three-dimensional object has the floating area that does not contact the road surface. Therefore, it is possible to prevent the vehicle 10 from hitting the three-dimensional object in advance.

Moreover, according to the vehicle accessibility determination device 100 according to the first embodiment of the present invention as configured above, the three-dimensional object detector 40 deletes the non three-dimensional objects. The deletion of the non three-dimensional objects is made based on a result of the frame difference between the two virtual images 72($t-\Delta t$), 72($t$) (overhead images) calculated in the first frame difference calculator 40$a$, and a result of the frame difference between the expected virtual image 72'($t$) and the other virtual image 72($t$) calculated in the second frame difference calculator 40$b$. The two virtual images 72($t-\Delta t$), 72($t$) (overhead images) are respectively generated from the two original images captured at different times. The expected virtual image 72'($t$) is expected to be generated from the original image captured at the same time as the time at which the original image ($t$) is captured which is the conversion source of the other virtual image 72($t$), and is expected based on the traveling amount and the moving direction of the vehicle 10 from the virtual image 72($t-\Delta t$) which is one of the two virtual images (overhead images). Also, the three-dimensional object detector 40 detects the three-dimensional object on the road surface by referring to the edge information of the virtual image 72($t$) detected in the edge detector 40$c$. Accordingly, it is possible to identify the three-dimensional object having a height from the road surface from paints, stains or darts on the road, or the vehicle shadow 87, and detect the three-dimensional object with a simple process.

Furthermore, according to the vehicle accessibility determination device 100 according to the first embodiment of the present invention as configured above, areas having same shapes (features) and located in close positions are detected from the first three-dimensional object candidate areas detected by the first frame difference calculator 40$a$ and the second three-dimensional object candidate areas detected by the second frame difference calculator 40$b$. When the detected areas are detected to be inclined toward the road surface in a direction away from the vehicle 10 based on the edge detection result of the virtual image 72($t$) by the edge detector 40$c$, the areas are detected as areas indicating the three-dimensional objects on the road surface. Accordingly, it is possible to reduce the influence of the time variation of the exposure characteristics of the camera, shadows, lighting, which may be mixed in the results of the frame differences, by referring to the edge detection result of the virtual image 72($t$). Therefore, the detection performance of the three-dimensional object can be further improved.

In the first embodiment, an example in which one front camera 12$a$ is used as the imager 12 is described. However, the number of cameras to be used is not limited to one. That is, it is also possible for the vehicle accessibility determination device to include a plurality of cameras directed to the front, the left, the right, and the rear of the vehicle 10 so as to be able to monitor the entire circumference of the vehicle 10. In this case, the original images captured by the respective cameras are respectively converted into a virtual image (overhead image), and then combined into one composite image. Processes described in the embodiment are performed on the composite image.

Further, in the first embodiment, an example of determining whether the vehicle 10 can access to the garage 82 or the other vehicle 11, each of which is a three-dimensional object, is described. However, the invention is not limited to a case where it is determined whether the vehicle 10 can access to the inside of a single three-dimensional object or not. That is, the invention may be applied to a case where it is determined whether the vehicle 10 can access to a space between two vehicles to park the vehicle 10 when the other two vehicles are parked with the space therebetween in a parking lot which does not have lines indicating a parking space for each vehicle. In this case, accessibility of the vehicle 10 is determined by detecting each of the two vehicles as the three-dimensional objects, by respectively calculating the width and the height of the space between the vehicles, and by comparing the calculated size (width and height) with that of the vehicle 10.

In addition, the procedure of the image processing described in the first embodiment is not limited to one described above in the embodiment. For example, the garage 82 is detected as one three-dimensional object from the virtual image 72($t$) when the garage 82 is uninterruptedly reflected within the virtual image 72($t$). Assuming above case as well, a procedure including detecting the road surface grounding line N from the virtual image 72($t$), and subsequently calculating the height H of the space above the road surface grounding line N may be applicable. Taking such the procedure, when the entire three-dimensional object is reflected in the virtual image 72($t$), the three-dimensional object region extraction process and the accessibility determination process are performed by using only the virtual image 72($t$). Accordingly, a series of processes can be performed more easily.

Further, according to the vehicle accessibility determination device 100 described in the first embodiment, it is configured to obtain the road surface grounding line N of the detected three-dimensional object, and to display and inform to a driver only the range to which the vehicle 10 cannot access in the road surface grounding line N. However, the invention is not limited to the above configuration. That is, it may be configured to automatically park the vehicle 10 based on the information of the range to which the vehicle 10 can access in the calculated road surface grounding line N, for example.

Moreover, in the first embodiment, the frame difference between the virtual images is performed to detect the three-dimensional object. However, the frame difference to be performed at that time is not limited to a frame difference between gray values representing brightness of the virtual images. That is, it is possible to perform an edge detection on the virtual images and then perform a frame differences between the virtual images in which the detected edge strengths are stored. It is also possible to perform a frame difference between the virtual images in which the detected edge directions are stored to detect an area where the change is occurred. Further, it is also possible to divide the virtual image into a plurality of small blocks and to use similarity of the histogram of the density histogram of each small block and/or the edge detection result.

Although the embodiments of the present invention are described in detail with reference to the drawings, the embodiments are only examples of the present invention.

Therefore, the present invention is not limited only to the configurations of the embodiments, and it will be appreciated that any design changes and the like that do not depart from the gist of the present invention should be included in the invention.

The invention claimed is:

1. A vehicle accessibility determination device comprising:
   a memory; and
   a central processing unit connected to the memory, the central processing unit being configured to:
      capture a range including a road surface around a vehicle via an imager to be attached to the vehicle;
      convert an original image captured by the imager into a virtual image to be viewed from a predetermined viewpoint;
      detect from the virtual image a three-dimensional object having a height from the road surface; and
      determine whether the vehicle is capable of accessing an inside of the three-dimensional object or a clearance among other three-dimensional objects,
   wherein the central processing unit is configured to determine whether the vehicle is capable of accessing the inside or the clearance by:
      extracting an area corresponding to the three-dimensional object from the original image;
      calculating a presence or an absence of a floating area that does not contact the road surface and a height of the floating area from the road surface relative to the extracted three-dimensional object area, and calculating a road surface projecting position in which the floating area is projected to the road surface from directly above, the floating area constituting the three-dimensional object area; and
      identifying whether there is a space inside the three-dimensional object or in the clearance among other three-dimensional objects to which the vehicle is capable of accessing, based on the presence or the absence of the floating area and the calculated road surface projecting position.

2. The vehicle accessibility determination device according to claim 1,
   wherein the central processing unit is further configured to
   superimpose to a road surface position of the virtual image a vehicle inaccessible range to which it is determined that the vehicle is not capable of accessing, or a vehicle accessible range to which it is determined that the vehicle is capable of accessing, and to display the ranges.

3. The vehicle accessibility determination device according to claim 1,
   wherein the central processing unit is configured to detect from the virtual image the three-dimensional object by:
      calculating a frame difference between two virtual images respectively generated from two original images captured at different times;
      converting one virtual image of the two virtual images into an expected virtual image that is expected to be generated from an original image captured at time when an original image, which is a conversion source of the other virtual image, is captured based on a traveling amount and a moving direction of the vehicle for the different times, and calculating a frame difference between the expected virtual image and the other virtual image; and
      detecting an edge of the one virtual image, and
   wherein the central processing unit is configured to detect a three-dimensional object on the road surface by deleting a non three-dimensional object on the road surface based on results of the calculating and the detecting.

4. A vehicle accessibility determination device comprising:
   a memory; and
   a central processing unit connected to the memory, the central processing unit being configured to:
      capture a range including a road surface around a vehicle via an imager to be attached to the vehicle;
      convert an original image captured by the imager into a virtual image to be viewed from a predetermined viewpoint;
      detect from the virtual image a three-dimensional object having a height from the road surface; and
      determine whether the vehicle is capable of accessing an inside of the three-dimensional object or a clearance among other three-dimensional objects,
   wherein the central processing unit is further configured to detect from the virtual image the three-dimensional object by:
      calculating a frame difference between two virtual images respectively generated from two original images captured at different times;
      converting one virtual image of the two virtual images into an expected virtual image that is expected to be generated from an original image captured at time when an original image, which is a conversion source of the other virtual image, is captured based on a traveling amount and a moving direction of the vehicle for the different times, and calculating a frame difference between the expected virtual image and the other virtual image; and
      detecting an edge of the one virtual image, and
   wherein the central processing unit is further configured to detect the three-dimensional object on the road surface by deleting a non three-dimensional object on the road surface based on results of the calculating and the detecting,
   wherein the central processing unit is further configured to detect:
      areas from first three-dimensional object candidate areas detected by the calculating and second three-dimensional object candidate areas detected by the calculating, the areas having same features and located in close positions relative to each other; and
      the areas as areas representing three-dimensional objects on the road surface when the areas are detected to be inclined toward the road surface in a direction away from the vehicle based on a result of the detecting.

5. A vehicle accessibility determination device comprising:
   a memory; and
   a central processing unit connected to the memory, the central processing unit being configured to:
      capture a range including a road surface around a vehicle via an imager to be attached to the vehicle;
      convert an original image captured by the imager into a virtual image to be viewed from a predetermined viewpoint;
      detect from the virtual image a three-dimensional object having a height from the road surface; and determine whether the vehicle is capable of accessing an inside of the three-dimensional object or a clearance among other three-dimensional objects wherein central processing unit is further configured to:
   superimpose to a road surface position of the virtual image a vehicle inaccessible range to which it is determined that the vehicle is not capable of accessing, or a vehicle accessible range to which it is determined that the vehicle is capable of accessing, and display the ranges, wherein the central processing unit is further configured to detect from the virtual image the three-dimensional object by:
   calculating a frame difference between two virtual images respectively generated from two original images captured at different times;
   converting one virtual image of the two virtual images into an expected virtual image that is expected to be generated from an original image captured at a time when an original image, which is a conversion source of the other virtual image, is captured based on a traveling amount and a moving direction of the vehicle for the different times, and calculating a frame difference between the expected virtual image and the other virtual image; and
   detecting an edge of the one virtual image, and wherein the central processing unit is further configured to detect the three-dimensional object on the road surface by deleting a non three-dimensional object on the road surface based on results of the calculating and the detecting, wherein the central processing unit is further configured to detect:
   areas from first three-dimensional object candidate areas detected by the calculating and second three-dimensional object candidate areas detected by the calculating, the areas having same features and located in close positions relative to each other; and
   the areas as areas representing three-dimensional objects on the road surface when the areas are detected to be inclined toward the road surface in a direction away from the vehicle based on a result of the detecting.

\* \* \* \* \*